United States Patent
Hsiao

(10) Patent No.: US 8,632,063 B2
(45) Date of Patent: Jan. 21, 2014

(54) POSITIONING FIXTURE

(71) Applicant: Yu-Chao Hsiao, New Taipei (TW)

(72) Inventor: Yu-Chao Hsiao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/629,979

(22) Filed: Sep. 28, 2012

(65) Prior Publication Data

US 2013/0312229 A1   Nov. 28, 2013

(30) Foreign Application Priority Data

May 28, 2012   (TW) .............................. 101118923 A

(51) Int. Cl.
    *B25B 11/00* (2006.01)
(52) U.S. Cl.
    USPC .............................................. 269/8; 269/287
(58) Field of Classification Search
    USPC ......... 269/229, 231, 236, 246, 249, 287, 311, 269/43, 6, 8, 95; 446/92
    See application file for complete search history.

(56) References Cited

U.S. PATENT DOCUMENTS

| | | | | |
|---|---|---|---|---|
| 2,269,389 A | * | 1/1942 | Weida | 425/406 |
| 2,383,008 A | * | 8/1945 | Meister | 269/8 |
| 2,409,936 A | * | 10/1946 | Hunt | 269/268 |
| 2,448,692 A | * | 9/1948 | Teetor | 335/306 |
| 3,184,882 A | * | 5/1965 | Vega | 446/92 |
| 3,519,262 A | * | 7/1970 | Dedek et al. | 269/47 |
| 4,623,156 A | * | 11/1986 | Moisson et al. | 279/106 |
| 4,881,411 A | * | 11/1989 | Holderfield et al. | 73/856 |
| 4,900,888 A | * | 2/1990 | Lee | 219/69.11 |
| 5,395,101 A | * | 3/1995 | Takimoto et al. | 269/289 R |
| 6,361,034 B1 | * | 3/2002 | Wolfe | 269/8 |
| 7,255,624 B2 | * | 8/2007 | Daftari | 446/92 |
| 7,273,404 B2 | * | 9/2007 | Kowalski et al. | 446/92 |

* cited by examiner

Primary Examiner — Lee D Wilson
Assistant Examiner — Tyrone V Hall, Jr.
(74) Attorney, Agent, or Firm — Altis Law Group, Inc.

(57) ABSTRACT

A positioning fixture includes a clamping member, a supporting member, and a magnet. The clamping member includes a base body and an end portion protruding from the base body. The supporting member includes a main body and at least one protruding portion protruding from the main body towards the clamping member. The main body includes a mounting surface adjacent to the protruding portion. The main body defines a receiving groove at the mounting surface. The protruding portion engages with the end portion. The magnet is mounted on at least one of the supporting member and the clamping member, and at least another one of the supporting member and the clamping member is made of magnetic material. The optical component receives in the receiving groove, and the magnet provides a clamping force to clamp the optical component by using the supporting member and the clamping member.

12 Claims, 2 Drawing Sheets

POSITIONING FIXTURE

BACKGROUND

1. Technical Field

The present disclosure relates to positioning fixtures, particularly to a positioning fixture configured for positioning an optical component for optical testing.

2. Description of Related Art

An optical testing device, such as an appearance inspection device, may be used to test optical properties of an optical component. Usually, a positioning fixture is needed to position the optical component. Because the precision of optical testing has risen up to a micron-sized precision and the precision of the positioning fixture directly affects the precision of the optical testing, thus the positioning fixture needs a high precision for achieving a high precision optical testing. However, the positioning fixture of more complex structures may cause a poor positioning precision during a complex assembling. Meanwhile, the positioning fixture of simpler structures may cause a poor stability due to being easily shaking or deviating, which thereby decreases the positioning precision.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
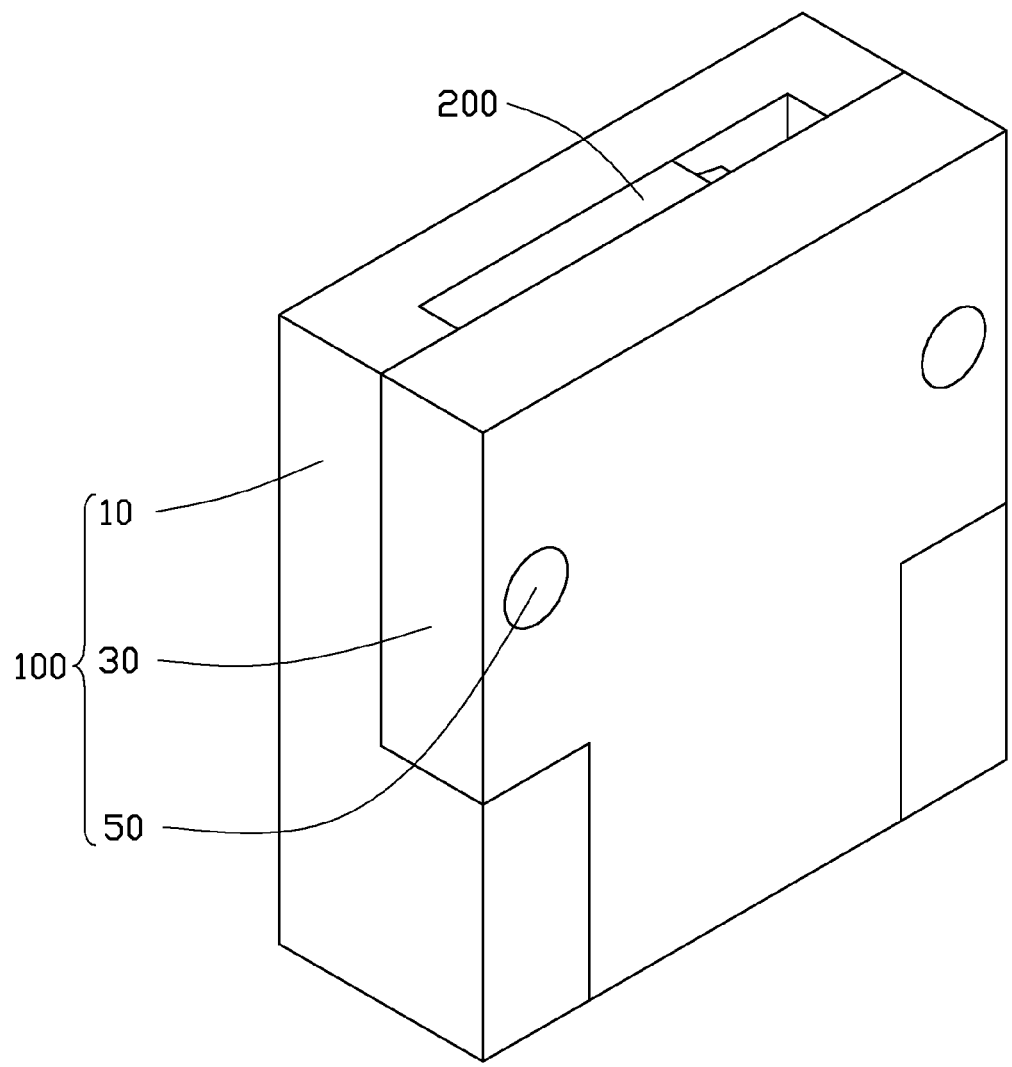
FIG. 1 is an isometric view of an embodiment of a positioning fixture with an optical component for positioning.
Figure 2:
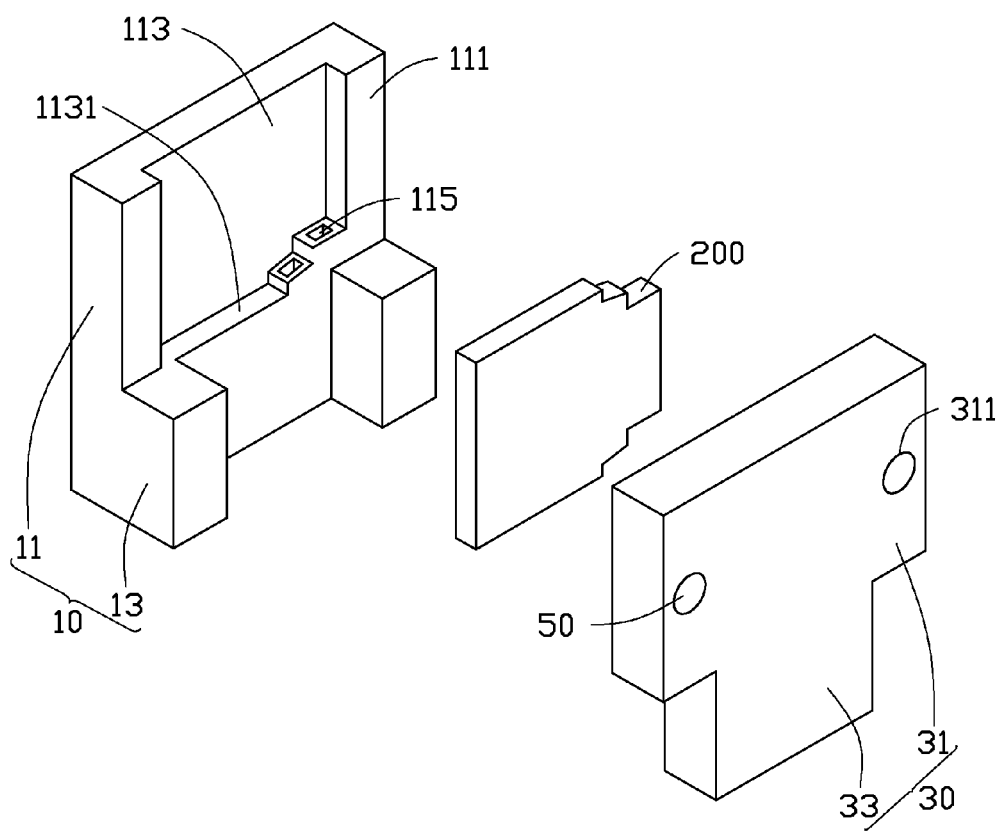
FIG. 2 is an exploded, isometric view of the positioning fixture with the optical component for positioning shown in FIG. 1.

Referring to FIGS. 1 and 2, an embodiment of a positioning fixture 100 is shown. The positioning fixture 100 positions an optical component 200, configured for conducting optical testing. In the illustrated embodiment, the optical component 200 is a cubic optical lens including two stepped sidewalls.

The positioning fixture 100 includes a supporting member 10, a clamping member 30, and a pair of magnets 50. The supporting member 10 is configured to receive and support the optical component 200. The magnets 50 are mounted on at least one of the supporting member 10 and the clamping member 30, and at least another one of the supporting member 10 and the clamping member 30 is made of magnetic material. The clamping member 30 overlaps with the supporting member 10 via the magnets 50, to sandwich the optical component 200 between the supporting member 10 and the clamping member 30, configured for optical testing. The magnets 50 provides the clamping force between the supporting member 10 and the clamping member 30, for steadily positioning the optical component 200, thus resulting in precise testing of the optical component 200. In the illustrated embodiment, the magnet 50 is mounted on the clamping member 30. The supporting member 10 is made of iron. In other embodiments, the magnets 50 can be mounted on the supporting member 10 or mounted on both of the supporting member 10 and the clamping member 30.

The supporting member 10 includes a main body 11 and a pair of protruding portions 13 protruding out from the main body 11 towards the clamping member 30. The main body 11 is substantially cubic, and includes a mounting surface 111 adjacent to the protruding portion 13. The main body 11 defines a receiving groove 113 at the mounting surface 111 corresponding or according to the optical component 200. The bottom of the receiving groove 113 forms a profile surface 1131 according to the stepped sidewall of the optical component 200. The main body 11 defines a pair of through holes 115 at the profile surface 1131, for allowing testing lights to pass through to test the optical component 200. In the illustrated embodiment, the profile surface 1131 is a stepped surface. In other embodiments, the number of the through hole 115 can be one, three, or more.

The pair of protruding portions 13 are located on two sides of the mounting surface 111, respectively. The protruding portions 13 are configured to support and engage with the clamping member 30, for stopping the supporting member 10 from shaking relative to the clamping member 30.

The clamping member 30 is substantially T-shaped, and includes a base body 31 and an end portion 33 protruding from the base body 31. The base body 31 defines a pair of receiving holes 311 corresponding to opposite edges of the main body 11 next to the receiving groove 113. The width of the end portion 33 substantially equals the width of a gap in between the pair of protruding portions 13. In other embodiments, the number of the protruding portions 13 can be one, three, or more, and the end portion 33 matches with the protruding portions 13.

The magnets 50 are received in the receiving holes 311. When the clamping member 30 engages with the supporting member 10 via the magnets 50, the end portion 33 is positioned between the pair of protruding portions 13, and the protruding portions 13 supports the base body 31. In the illustrated embodiment, the height of the end portion 33 substantially equals to the height of the protruding portions 13. In other embodiment, the number of the magnets 50 can be one, three, or more. The clamping force between the supporting member 10 and the clamping member 30 can be adjusted by changing the number or magnetic intensity of the magnets 50. The magnets 50 can be mounted on opposite edges of the main body 11 besides the receiving groove 113 or can be mounted on the end portion 33.

In use, the optical component 200 is put into the receiving groove 113 with the stepped sidewall of the optical component 200 towards the profile surface 1131, thus the optical component 200 is properly received in the receiving groove 113. The base body 31 is positioned on the protruding portions 13, and the end portion 33 is located between the pair of protruding portions 13. The clamping member 30 resists the mounting surface 111 of the supporting member 10, and the clamping member 30 covers the receiving groove 113. The magnets 50 provides the clamping force to position the optical component 200 by using the supporting member 10 and the clamping member 30. A testing light source (not shown) is configured to be disposed below the positioning fixture 100. The testing light emitted by the testing light source passes through the through holes 115, and reaches to the optical component 200, for conducting an optical testing to the optical component 200.

Because the magnets 50 provide the clamping force, and the supporting member 10 engages with the clamping member 30 tightly, thus the optical component 200 steadily stays in the receiving groove 113 and a precise optical test can be thereby conducted. Because the assembling of the positioning fixture 100 with the optical component 200 becomes very easy, thus an assembling mistake can be thereby avoided.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A positioning fixture, for clamping an optical component for conducting an optical testing, comprising:
    a clamping member comprising a base body and an end portion protruding from the base body;
    a supporting member comprising a main body and two protruding portions protruding from the main body towards the clamping member, the main body comprising a mounting surface adjacent to the clamping member, the main body defining a receiving groove at the mounting surface, the protruding portions engaging with the end portion of the clamping member, and a width of the end portion substantially equal to a width of a gap between the protruding portions; and
    at least one magnet mounted on at least one of the supporting member and the clamping member, and the other one of the supporting member and the clamping member is made of magnetic material;
    wherein the clamping member resists with the mounting surface of the supporting member, and covers the receiving groove to position the optical component in the receiving groove by a magnetic force provided by the at least one magnet.

2. The positioning fixture of claim 1, wherein the bottom of the receiving groove defines a profile surface matching with a profile of the optical component, the supporting member defines at least one through hole at the profile surface, for allowing a testing light to pass through to test the optical component.

3. The positioning fixture of claim 1, wherein the base body defines at least one receiving hole corresponding to opposite edges of the main body next to the receiving groove, the at least one magnet is received in the receiving hole, and the supporting member is made of magnetic material.

4. The positioning fixture of claim 1, wherein the at least one magnet is mounted on opposite edges of the main body next to the receiving groove, and the clamping member is made of magnetic material.

5. The positioning fixture of claim 1, wherein the at least one magnet is mounted on the end portion, and the supporting member is made of magnetic material.

6. The positioning fixture of claim 1, wherein a height of the end portion equals a height of the protruding portions, when the clamping member engages with the supporting member, the at protruding portions support the base body.

7. A positioning fixture, comprising:
    a clamping member comprising a base body and an end portion protruding from the base body;
    a supporting member comprising a main body and a pair of protruding portions protruding from the main body towards the clamping member, the main body comprising a mounting surface adjacent to the protruding portion, the main body defining a receiving groove at the mounting surface, the pair of protruding portions engaging with the end portion of the clamping member, and a width of the end portion substantially equal to a width of a gap between the protruding portions; and
    at least one magnet mounted on at least one of the supporting member and the clamping member, and the other one of the supporting member and the clamping member is made of magnetic material;
    wherein the clamping member resists with the mounting surface of the supporting member and covers the receiving groove via a magnetic force provided by the at least one magnet.

8. The positioning fixture of claim 7, wherein the bottom of the receiving groove defines a profile surface, the supporting member defines at least one through hole at the profile surface.

9. The positioning fixture of claim 7, wherein the base body defines at least one receiving hole corresponding to opposite edges of the main body next to the receiving groove, the at least one magnet is received in the receiving hole, the supporting member is made of magnetic material.

10. The positioning fixture of claim 7, wherein the at least one magnet is mounted on opposite edges of the main body next to the receiving groove, and the clamping member is made of magnetic material.

11. The positioning fixture of claim 7, wherein the at least one magnet is mounted on the end portion, and the supporting member is made of magnetic material.

12. The positioning fixture of claim 7, wherein a height of the end portion equals a height of the pair of protruding portions, when the clamping member engages with the supporting member, the pair of protruding portions supports the base body.

* * * * *